Figure 1:
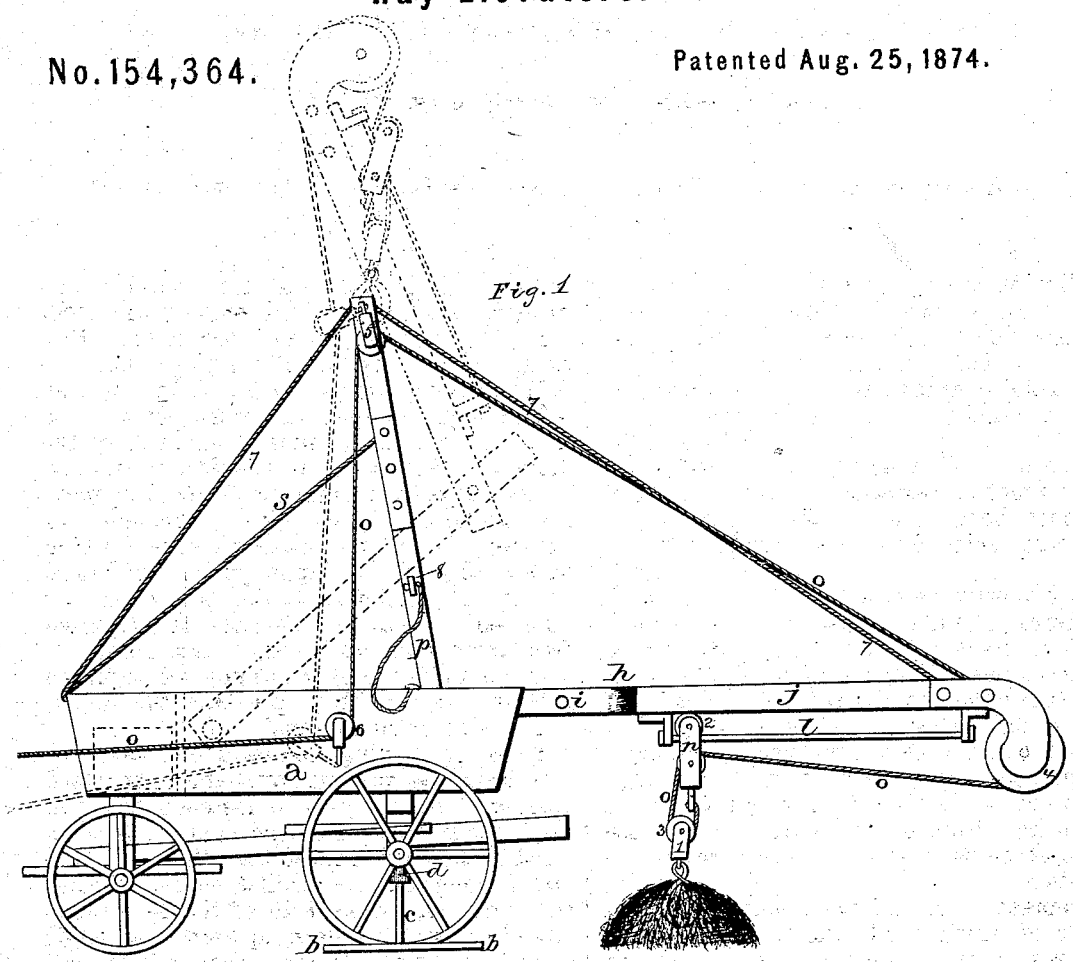
Figure 2:
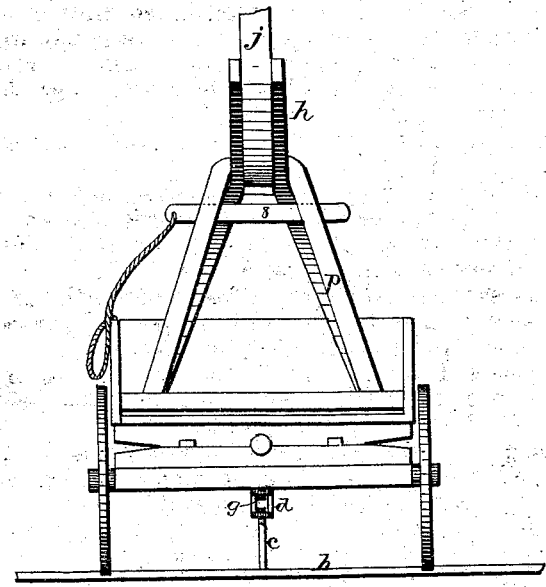

W. ADAMS.
Hay-Elevators.

No. 154,364. Patented Aug. 25, 1874.

WITNESSES.
J. Wm Garner
Frank Clauty

INVENTOR.
Wm Adams
per
J. A. Lehmann
Atty.

UNITED STATES PATENT OFFICE.

WILLIAM ADAMS, OF JEFFERSONVILLE, INDIANA.

IMPROVEMENT IN HAY-ELEVATORS.

Specification forming part of Letters Patent No. 154,364, dated August 25, 1874; application filed August 7, 1874.

*To all whom it may concern:*

Be it known that I, WILLIAM ADAMS, of Jeffersonville, in the county of Clarke and State of Indiana, have invented certain new and useful Improvements in Hay-Derricks; and I do hereby declare the following to be a full, clear, and exact description of the invention, such as will enable others skilled in the art to which it pertains to make and use it, reference being had to the accompanying drawings, which form part of this specification.

My invention relates to an improvement in hay-derricks; and it consists in a jointed beam, which is pivoted to the wagon-bed, a brace, and the ropes and tackle, by which the hay is hoisted into the barn through an opening in the roof. It also consists in a recessed board, upon which the rear wheels of the wagon rest, and a clamping device, by means of which the wagon is secured to the board, so as to prevent the wagon from tipping over or moving sidewise.

The accompanying drawings represent my invention.

$a$ represents an ordinary wagon, the rear wheels of which, while the wagon is being used, rest in two depressions made in the top of a long board, $b$. Secured to this board, at or near its center, is the vertical rod $c$, to the top of which is attached the swivel $d$, which screws upon the screw rod or bolt $g$, which projects downward from the under side of the rear axle. By means of this board and clamping device the wagon is securely held against any side motion, and is also prevented from accidentally upsetting while being used. Pivoted to the inside of the wagon-bed is a beam, $h$, which is made in two parts and pivoted together at the point $i$, the outer part, $j$, being allowed a free vertical movement, but not allowed to descend lower than out upon a straight line with the other part, as shown. To the under side of the part $j$ is secured a guide or way, $l$, upon which the carriage $n$ moves back and forth. This carriage consists of a suitable frame, in which there are journaled two rollers or pulleys, the upper one, 2, of which supports the carriage upon the guide, while the lower one, 3, serves as a pulley, over which the rope $o$ passes. This rope has one end secured to the carriage, then passes down through the block 1, to which the hay-fork is attached, up over the pulley 3, around over the pulley 4 on the end of the part $j$, back through the block 5, and down through the block 6, attached to the side of the wagon-bed, where the rope is fastened to a horse. Pivoted near the rear end of the wagon-bed is a brace, $p$, which has its lower end forked, so as to straddle over and allow the beam to be raised upward to an angle of about forty-five degrees. This brace can be raised upward to a vertical position, but is prevented from moving any farther by the rope $s$. Fastened to the front end of the wagon is a rope, 7, which passes through the upper end of the brace, and is then fastened to the part $j$, near its outer end, so that the beam can be prevented from descending below any desired point.

In the front end of the wagon-bed is placed a heavy weight, which prevents the wagon from tilting up at that end.

The wagon having been secured to the board $b$, as described, near the hay that is to be raised into the barn, the fork is fastened to it and the horse started. The load is first raised upward to the carriage, and then the carriage is drawn along the guide until it reaches its outer end, when the whole draft of the horse is exerted in raising the beam upward to an angle of about forty-five degrees, when it is secured in that position by means of a key, 8, which is passed through the side of the brace under it. As soon as the beam is keyed in position the continued draft of the horse causes the part $j$ to rise vertically upward over the bed of the wagon, when by backing the horse the load falls into the barn through an opening in the roof.

Having thus described my invention, I claim—

1. The combination of the pivoted jointed beam $h\ j$, guide or way $l$, carriage $n$, pulley 4, rope $o$, brace $p$, and blocks, substantially as set forth.

2. The combination of the brace $p$ and key $s$ with the pivoted jointed beam $h\ j$, substantially as set forth.

3. The combination of the wagon-board $b$, rod $c$, swivel $d$, and bolt $g$, substantially as specified.

In testimony that I claim the foregoing I have hereunto set my hand this 1st day of August, 1874.

WILLIAM ADAMS.

Witnesses:
E. HAWLEY,
HOWARD JOHNSTON.